(12) United States Patent
Beal et al.

(10) Patent No.: US 6,253,295 B1
(45) Date of Patent: Jun. 26, 2001

(54) SYSTEM AND METHOD FOR ENABLING PAIR-PAIR REMOTE COPY STORAGE VOLUMES TO MIRROR DATA IN ANOTHER PAIR OF STORAGE VOLUMES

(75) Inventors: David Grant Beal, Longmont; Michael Steven Milillo, Louisville; Christopher James West, Boulder, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,114

(22) Filed: Jul. 20, 1998

(51) Int. Cl.[7] .................................................. G06F 12/00
(52) U.S. Cl. ........................ 711/162; 711/112; 711/165; 707/204
(58) Field of Search ........................... 711/111, 112, 161, 711/162, 114, 165; 707/204

(56) References Cited

U.S. PATENT DOCUMENTS

| | | |
|---|---|---|
| 4,979,108 | 12/1990 | Crabbe, Jr. . |
| 5,051,887 | 9/1991 | Berger et al. . |
| 5,446,871 | 8/1995 | Shomler et al. . |
| 5,504,861 | 4/1996 | Crockett et al. . |
| 5,586,310 | 12/1996 | Sharman . |
| 5,615,329 | 3/1997 | Kern et al. . |

OTHER PUBLICATIONS

IBM Technical Discousre Bulletin, vol. 38, No. 09, Sep. 1995 pp. 95–98, "Management of Peer–to–Peer Control Unit Paths".

*Primary Examiner*—Kevin Verbrugge
(74) *Attorney, Agent, or Firm*—Ohlandt, Greeley, Ruggiero & Perle

(57) ABSTRACT

A data storage system including first, second, third and fourth virtual storage volumes, the first and second virtual storage volumes controlled to enable a mirroring and synchronization of data therebetween. The data storage system further includes a first processor that is responsive to a "copy pair" command or its equivalent to copy a directory from the first virtual storage volume to a directory of the third virtual storage volume. The first processor also dispatches a copy command, or its equivalent, to copy the directory of the second virtual storage volume to the directory of the fourth storage volume. A second processor is responsive to the copy command to cause a copying of the directory of the second virtual storage volume to the directory of the fourth virtual storage volume. Thus, the third and fourth virtual storage volumes are controlled to include directories which duplicate directories of the first and second virtual storage volumes.

13 Claims, 3 Drawing Sheets

SYSTEM AND METHOD FOR ENABLING PAIR-PAIR REMOTE COPY STORAGE VOLUMES TO MIRROR DATA IN ANOTHER PAIR OF STORAGE VOLUMES

RELATED APPLICATION

This Application is related to U.S. patent application Ser. No. 09/119,124 entitled "System and Method for Enabling Pair-Pair Remote Copy Storage Volumes to Mirror Data in Another Storage Volume" to Beal et al.

FIELD OF THE INVENTION

This invention relates to systems wherein data storage devices maintain shared copies of data and, more particularly, to a system and method for creating a snapshot of directories in one peer to peer remote copy (PPRC) virtual storage volumes to a further pair of virtual storage volumes.

BACKGROUND OF THE ART

The typical digital computer system includes one or more disk subsystems for storing both data and instructions. Disks within the disk subsystems are divided into a plurality of tracks, at selected radial distances from the center and sectors which define particular angular regions in each track. When plural disks are present in a disk system, identically positioned tracks on each disk are handled as a volume (or cylinder).

Since stored data may be corrupted or destroyed, backup systems have been developed to create multiple copies of the stored data, usually on separate disk drives so that in such an event, the data can been recovered from one or more of the copies. Such provision of copies is referred to as either "shadowing" or "mirroring" of the data. When such mirroring is carried on between a pair of remotely located disk volumes, those disk volumes are referred to as a "peer to peer remote copy" (PPRC) pair.

While a PPRC pair may create mirrored copies at discrete intervals, many PPRC pairs now mirror their data on a continuing basis so as to maintain their respective data copies in synchronism. While such backup copying techniques are frequently used, they are expensive in terms of required processing time, especially when the virtual storage volume system stores large amounts of data.

As those skilled in the art understand, many host processors are programmed to provide data addresses in a form dictated by disk drive configurations that are now obsolete. Such outmoded disk drive configurations comprised relatively large diameter storage disks that were addressed on the basis of a cylinder (i.e., tracks on a plurality of disks) and a read/write head (to designate a particular disk). Currently, in lieu of such large disk systems, the industry has migrated to use of multiple small disk drive systems that are available on a commodity basis and, as a result, are inexpensive yet reliable.

To avoid having to re-program the host processors, storage systems using these small disk drives incorporate an address translation facility which converts the host data addresses (i.e., cylinder and head) to virtual storage volume addresses, such addresses defining physical addresses of disk systems that comprise the virtual storage volume. The virtual storage volume may be spread across many physical disk drives, with the virtual volume host addresses being related to physical disk addresses by a virtual volume directory. Thus, a storage system establishes virtual storage volumes which conform to the host addresses, even though such virtual storage volumes do not exist in reality, but rather exist in a distributed fashion across plural small disk drives.

As can thus be seen, data from a host processor can be spread across many disk drives and is thereafter only accessible by reference to an associated virtual volume directory. To, in effect, make a "copy" of data in a virtual volume, a copy or "snapshot" of a virtual volume directory is sometimes created, with each entry in the virtual volume directory comprising a pointer to a disk physical address which corresponds to a host-received virtual volume address.

A cost efficient data preservation technique employs the concept of transferring to a target virtual storage volume, a "snapshot" copy of a virtual storage volume directory that is to be mirrored. Such a directory transfer preferably occurs at predetermined intervals, i.e., not continuously. Such a snapshot action is facilitated by employing a log-structured file storage procedure. Such a procedure assures that writes of data updates to disk are never done in place. More specifically, when update data is written to disk, it is never overwritten on the old data, but rather is written to a new location.

Accordingly, when a virtual storage volume directory, configured as a log-structured array, is updated to reflect the location of the updated data, only the last entry in the directory which refers to the updated data is valid, even though the directory contains a prior entry indicating the previous location of the old data (which still remains on disk). Thus, when a virtual storage volume is updated, the entry designating the updated copy is written at the end of the log file. Until updated, other copies of the log-structured directory still include entries whose pointers point to the locations of the pre-update (i.e., old) data.

During creation of a snapshot copy of a directory of a virtual storage volume, access to the virtual storage volume is suspended until the snapshot operation is complete.

The prior art includes a number of teachings regarding enhancements of data mirroring actions. For instance, U.S. Pat. No. 5,592,618 to Micka et al. describes a data copy validation technique which compares primary data to a copy of that data by generating check codes of the data to be validated at both primary and secondary volumes in a data mirroring system. The validation session runs concurrently with the data mirroring so as not to disrupt the mirroring action.

U.S. Pat. 5,615,329 to Kern et al. describes a remote data mirroring system which provides real-time disaster recovery, wherein a secondary volume is located remotely from the primary volume. Upon a failure at the primary volume, an error recovery program is invoked and if successful, enables resumption of the duplex operation.

U.S. Pat. No. 5,504,861 to Crockett et al. discloses a remote data mirroring system wherein data updates are transmitted asynchronously from a primary volume to a secondary volume. The mirroring of data being updated is optimized by sorting the record updates according to secondary volume device storage locations and chaining pluralities of input/output control command words according to the sorted data updates. Further data mirroring/shadowing techniques can be found in the following U.S. Pat. Nos. 5,623,599; 5,446,871 and 4,979,108.

After data has been mirrored on a PPRC virtual volume pair, it is sometimes desired to make a new set of copies of directories using a snapshot of the PPRC virtual volume pair. Such new set of copies may then be utilized when making alterations, updates, replacements or other changes to a program. However, communication paths between the PPRC virtual volume pair and the virtual volumes which are to contain the additional directories may not be readily available.

Accordingly, it is an object of this invention to provide an improved method and apparatus for transferring copies of directories of a PPRC virtual volume pair to a second pair of co-located virtual volumes.

It is another object of this invention to provide a method and apparatus for achieving a mirroring operation of directories in a pair of virtual storage volumes, wherein PPRC copy procedures that are already present, are utilized to achieve the mirroring.

SUMMARY OF THE INVENTION

A data storage system including first, second, third and fourth virtual storage volumes, the first and second virtual storage volumes controlled to enable a mirroring and, synchronization of data therebetween. The data storage system further includes a first processor that is responsive to a "copy pair" command or its equivalent to copy a directory from the first virtual storage volume to a directory of the third virtual storage volume. The first processor also dispatches a copy command, or its equivalent, to copy the directory of the second virtual storage volume to the directory of the fourth storage volume. A second processor is responsive to the copy command to cause a copying of the directory of the second virtual storage volume to the directory of the fourth virtual storage volume. Thus, the third and fourth virtual storage volumes are controlled to include directories which duplicate directories of the first and second virtual storage volumes.

DETAILED DESCRIPTION OF THE INVENTION

Figure 1:
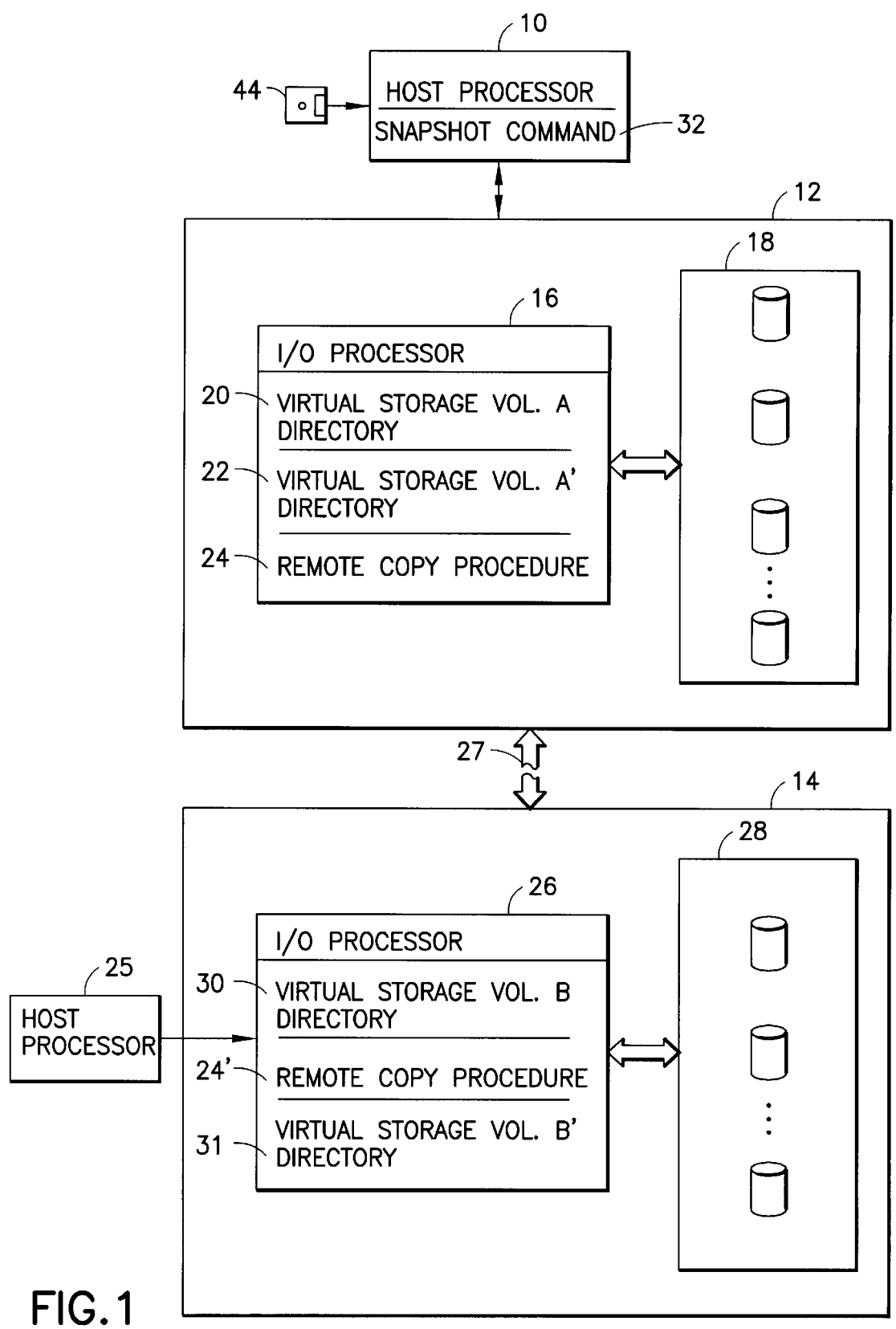
FIG. 1 is a block diagram of a data storage system particularly adapted to carrying out the invention hereof.

Referring to FIG. 1, a host processor 10 utilizes (i) data storage system 12 as a mass data storage facility and (ii) data storage system 14, which is located remotely from data storage system 12, as a data recovery facility (in the event of a failure of data storage system 12). Accordingly, a data mirroring procedure is periodically carried out between data storage systems 12 and 14 to assure a continued synchronism of their shared data.

Data storage system 12 includes input/output processor 16 which controls transfer of data and commands to and from host processor 10. Data storage system 12 further includes a plurality of disk drive systems 18 which provide a mass storage facility for host processor 10. In addition to controlling data flow both into and out of disk drive systems 18, input/output processor 16 further includes a plurality of directories for virtual storage volumes that are spread across disk drive systems 18.

For the purpose of further describing the invention, it will be assumed that input/output processor 16 includes two directories, i.e., a virtual volume A directory 20 and a virtual volume A' directory 22. Further, input/output processor 16 includes a remote copy procedure 24 which enables a mirroring of data stored in virtual volume A to a virtual volume B in data storage system 14. Accordingly virtual volumes A and B constitute a PPRC pair, implying that their respective directories are maintained in a state of synchronism by remote copy procedure 24.

Data storage system 14 provides a mass storage facility for host processor 25 and, in addition, includes a plurality of virtual storage volumes, one of which constitutes virtual volume B wherein mirrored data from data storage system 12 is stored, via communication link 27.

Data storage system 14 includes an input/output processor 26 which handles transfer of data and commands to and from input/output processor 16. Data storage system 14 further includes a plurality of disk drive systems 28 wherein the data which is arranged into virtual volumes is actually stored. In that regards, it will be assumed that input/output processor 26 includes a directory 30 for a virtual storage volume B that is spread across disk drive systems 28 and a directory 31 for a virtual storage volume B' that is also spread across disk drive systems 28. Also contained within input/output processor 26 is a remote copy procedure 24' which operates in conjunction with remote copy procedure 24 to enable a mirroring of virtual storage volume data.

It will be hereafter assumed that virtual storage volumes A and B are configured by remote copy procedures 24, 24' as a PPRC pair. Accordingly, when remote copy procedure 24 performs a write to virtual storage volume A, a further write action is performed to virtual storage volume B to maintain a continued synchronism therebetween.

As indicated above, there are circumstances when it is desired to derive copies of both directories 20 and 30 so as to provide dual views of data at a specific time. This enables program analysis, alteration and the testing thereof without possible damage to the original directories and data represented thereby. Further, once copying of the directories is complete, an originating PPRC pair becomes available for further accesses from the host processor. Likewise, since the data is stored to disk in a log structured manner, the old (non-updated) data remains available to the duplicated virtual volume directories, even after the original directories are modified as a result of subsequent data updates.

Figure 2:
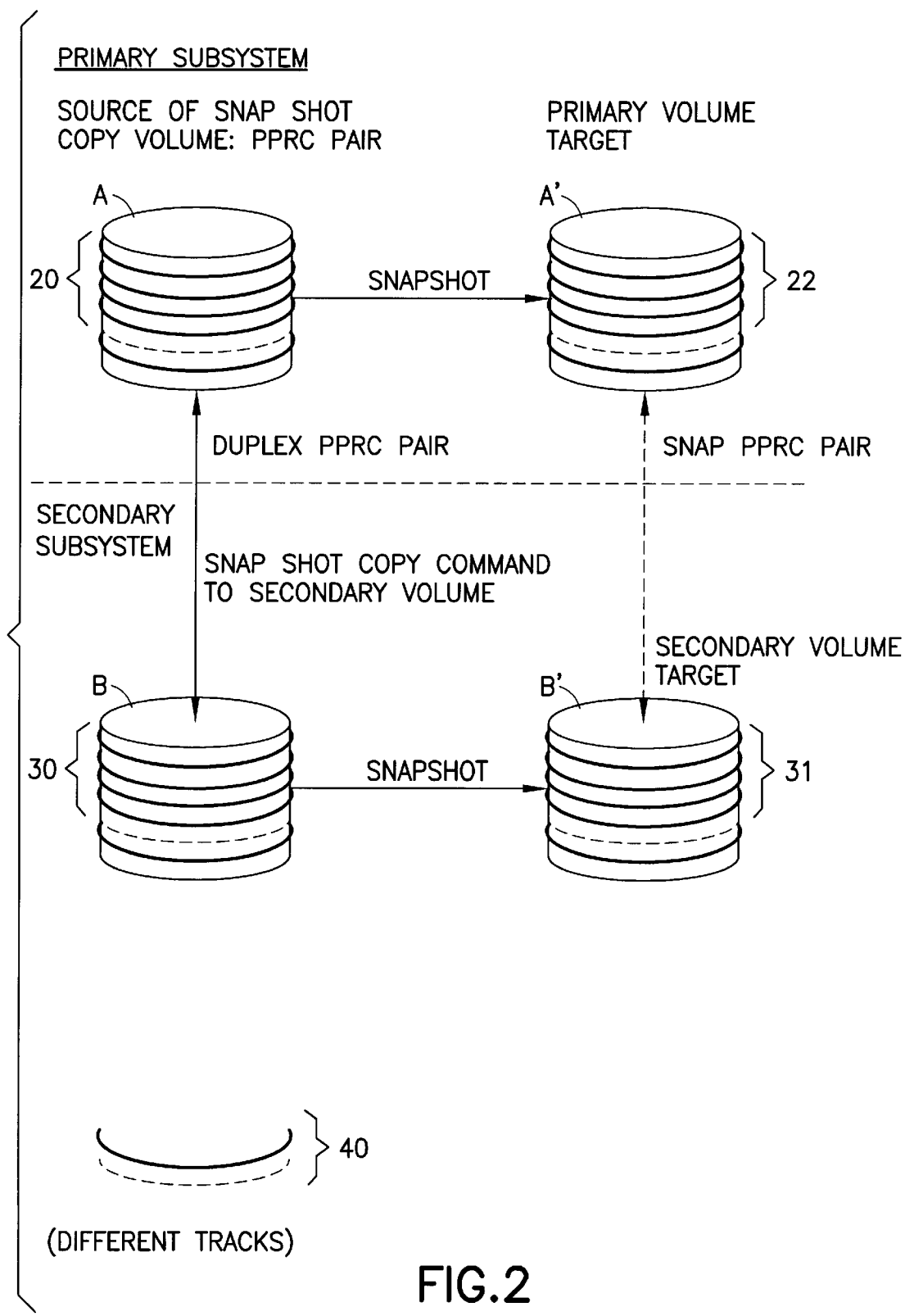
FIG. 2 is a schematic diagram illustrating the method of the invention.
Figure 3:
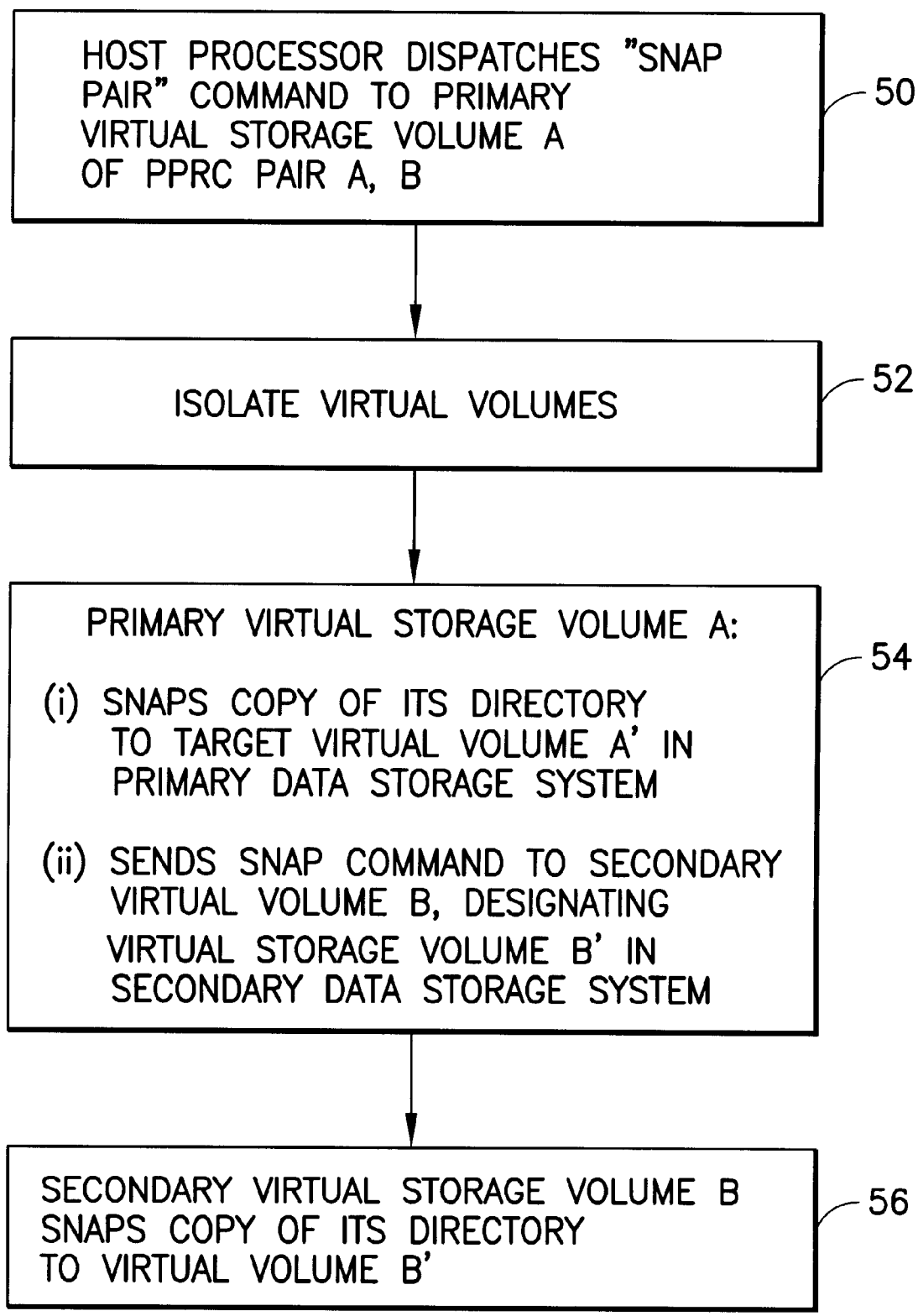
FIG. 3 is a logical flow diagram illustrating the method of the invention.

Referring to FIG. 2 in conjunction with the logic flow diagram of FIG. 3, the invention will be further described. Note that FIG. 2 schematically illustrates the disk volume regions pointed to by the respective virtual volume directories. To achieve a duplication of virtual volume A directory 20 and virtual volume B directory 30, host processor 10 issues a "snap pair" command 32 which is received by I/O processor 16 (step 50). It will be assumed that snap pair command 32 designates virtual volumes A' and B' as target volumes for snap actions.

In response to snap pair command 32, I/O processor 16 invokes remote copy procedure 24 which isolates virtual volume A from further accesses until completion of the snap pair command (step 52). Further, remote copy procedure 24 causes (i) a copy of virtual storage volume A directory 20 to be dispatched to virtual volume A' in primary data storage system 12 (or made available through creation of an additional copy thereof in a memory region that is accessible to virtual volume A') and (ii) a "snap" command to be dispatched to virtual volume B, designating virtual volume B' as the target volume for the snap action. Recall that remote copy procedure 24 has maintained synchronism between virtual volumes A and B so it is assured that they both contain the same data (step 54). Thereafter, remote copy procedure 24' responds to the snap command and causes a copy of virtual storage volume B directory 30 to be dispatched (or made available thereto) to virtual volume B' in secondary data storage system 14.

At such time, a copy of virtual storage volume A directory 20 exists in virtual storage volume A' directory 22 and a copy of virtual storage volume B directory 30 exists in virtual storage volume B' directory 31, all pointing to identical data (at a specific point in time) in disk drives 18 and 18', respectively. Thereafter, copies of the actual data 40 (FIG. 2) may be mirrored, as required.

It should be understood that the foregoing description is only illustrative of the invention. Various alternatives and modifications can be devised by those skilled in the art without departing from the invention. For example, a "complete" signal may be issued to the host processor when the transfer to a pair of virtual volumes of the virtual volume directories is accomplished. Such a signal indicates the availability of further accesses to the originating virtual volume by the host processor. Further, while the procedures required to execute the invention hereof are indicated as already loaded into memory of the storage subsystems, they may be configured on a storage media, such as data memory 44 in FIG. 1, for subsequent loading into the RAM of the controlling subsystem processors. Accordingly, the present invention is intended to embrace all such alternatives, modifications and variances which fall within the scope of the appended claims.

What is claimed is:

1. A data storage system including first storage means, second storage means, third storage means and fourth storage means, said first and second storage means arranged to enable a mirroring of data therebetween using remote copy procedures so as to maintain a synchronism of data therebetween, said storage system further comprising:

first processor means responsive to a copy pair command, or an equivalent command, from a host processor, for (i) copying a directory from said first storage means to a directory for said third storage means and for (ii) dispatching a copy command, or an equivalent command from said remote copy procedures, to copy a directory for said second storage means to a directory for said fourth storage means; and second processor means coupled to said second storage means and said fourth storage means and responsive to said dispatched copy command or said equivalent command from said first processor means, to cause copying of said directory of said second storage means to said directory of said fourth storage means using said remote copy procedures, whereby said third and fourth storage means are each controlled to include directories which duplicate said directories of said first and second storage means.

2. The data storage system as recited in claim 1, wherein said first processor means is controlled to inhibit accesses to said first storage means during said copying of said directory of said first storage means to said directory of said third storage mean.

3. The data storage system as recited in claim 1, wherein each of said first storage means, second storage means, third storage means and fourth storage means is configured as a virtual storage volume.

4. The data storage system as recited in claim 1, wherein said first storage means and third storage means are co-located in a primary storage system and said second storage means and fourth storage means are co-located in a secondary storage system distantly located from said primary storage system.

5. The data storage system as recited in claim 1, further comprising: further storage means for storing said data pointed to by said directory, said further storage means storing both update data and old data in a log-structured arrangement so as to avoid said update data from being written over old data being updated.

6. A memory media including a program for controlling a data storage system, said data storage system including first storage means, second storage means, third storage means and fourth storage means, first processor means for controlling said first and third storage means, second processor means for controlling said second and fourth storage means, said first processor means operative to enable said first and second storage means to mirror data therebetween and maintain such data in synchronism using remote copy procedures, said memory media further comprising:

a) means for controlling said first processor means to respond to a copy pair command, or an equivalent command, from a host processor, by (i) copying a directory from said first storage means to a directory for said third storage means and (ii) dispatching a copy command, or an equivalent command, from said remote copy procedures to copy a directory of said second storage means to a directory for said fourth storage means; and b) means for controlling said second processor means to respond to said dispatched copy command or said equivalent command from said first processor means, by copying said directory of said second storage means to said directory of said fourth storage means using said remote copy procedures, whereby said third and fourth storage means are each controlled to include directories which duplicate said directories of said first and second storage means.

7. The memory media as recited in claim 6, wherein means a) controls said first processor means to inhibit accesses to said first storage means during said copying of said directory of said first storage means to said directory of said third storage means.

8. The memory media as recited claim 6, wherein each of said first storage means, second storage means, third storage means and fourth storage means is configured as a virtual storage volume.

9. The memory media as recited in claim 6, wherein said data storage system includes further storage means for storing said data pointed to by said directory, said means a) causing said further storage means to store both update data and old data in a log-structured arrangement so as to avoid said update data being written over old data being updated.

10. A method for controlling a data storage system, said data storage system including first storage means, second storage means, third storage means and fourth storage means, first processor means for controlling said first and third storage means, second processor means for controlling said second and fourth storage means, said first processor means operative to control said first and second storage means to mirror data and maintain data synchronism therebetween using a remote copy procedure, said method further comprising the steps of:

a) controlling said first processor means to respond to a copy pair command, or an equivalent command, from a host processor, by (i) copying a directory from said first storage means to a directory for said third storage means and by (ii) dispatching a copy command, or an equivalent command, from said remote copy procedures to copy a directory for said second storage means to a directory of said fourth storage means; and b) controlling said second processor means to respond to said dispatched copy command from said first processor, by copying said directory of said second storage means to said directory of said fourth storage means using said remote copy procedures, whereby said third and fourth storage means are each controlled to include directories which duplicate said directories of said first and second storage means.

11. The method as recited in claim 10, wherein step a) controls said first processor means to inhibit accesses to said first storage means during said copying of said directory of said first storage means to said directory of said second storage means.

12. The method as recited in claim 10, wherein each of said first storage means, second storage means, third storage means and fourth storage means is configured as a virtual storage volume.

13. The method as recited in claim 10, wherein said data storage system includes further storage means for storing said data pointed to by said directory, said step a) causing said further storage means to store both update data and old data in a log-structured arrangement so as to avoid said update data being written over old data being updated.

* * * * *